United States Patent
Rueger et al.

(10) Patent No.: US 10,214,673 B2
(45) Date of Patent: Feb. 26, 2019

(54) THERMALLY CONDUCTIVE, PLATE-SHAPED PIGMENT COATED WITH ALUMINIUM OXIDE

(71) Applicant: MERCK PATENT GMBH, Darmstadt (DE)

(72) Inventors: Reinhold Rueger, Roedermark (DE); Matthias Kuntz, Seeheim-Jugenheim (DE)

(73) Assignee: MERCK PATENT GMBH, Darmstadt (DE)

( * ) Notice: Subject to any disclaimer, the term of this patent is extended or adjusted under 35 U.S.C. 154(b) by 50 days.

(21) Appl. No.: 14/387,489

(22) PCT Filed: Mar. 5, 2013

(86) PCT No.: PCT/EP2013/000642
§ 371 (c)(1),
(2) Date: Sep. 23, 2014

(87) PCT Pub. No.: WO2013/139435
PCT Pub. Date: Sep. 26, 2013

(65) Prior Publication Data
US 2015/0069287 A1 Mar. 12, 2015

(30) Foreign Application Priority Data
Mar. 23, 2012 (DE) .......... 10 2012 005 754

(51) Int. Cl.
*C09K 5/14* (2006.01)
*C09C 1/00* (2006.01)
*H01B 19/04* (2006.01)

(52) U.S. Cl.
CPC .............. *C09K 5/14* (2013.01); *C09C 1/0021* (2013.01); *H01B 19/04* (2013.01); *C09C 2200/102* (2013.01); *C09C 2200/1004* (2013.01)

(58) Field of Classification Search
CPC ... C09K 5/14; C09K 5/08; C09K 5/00; C09K 2003/1093; H01B 19/04; H01B 17/00; H01B 17/56; H01B 5/16; H01B 1/00; H01B 1/14; H01B 1/06; H01B 3/02; H01B 3/08; C09D 5/24
USPC .......................................................... 252/71
See application file for complete search history.

(56) References Cited

U.S. PATENT DOCUMENTS 3,372,047 A * 3/1968 Linton et al. ............... 106/416
3,520,845 A * 7/1970 McKeown et al. .......... 428/324
3,686,599 A * 8/1972 Lee ............................... 336/96
5,165,996 A 11/1992 Jacobson
5,248,557 A 9/1993 Jacobson
5,672,200 A * 9/1997 Heinz et al. .................. 106/403
6,267,810 B1 7/2001 Pfaff
6,517,628 B1* 2/2003 Pfaff et al. .................... 106/417
7,226,503 B2 6/2007 Anselmann
7,547,847 B2 6/2009 Miller
2003/0177950 A1* 9/2003 Schoen et al. ............... 106/415
2004/0134385 A1* 7/2004 Anselmann et al. ......... 106/415
2008/0066942 A1 3/2008 Miller
2008/0279796 A1* 11/2008 Handrosch ............ C09C 1/0015
424/63
2011/0118384 A1* 5/2011 Bugnon ................ C09C 1/0021
523/171
2017/0044374 A1 2/2017 Schmidt

FOREIGN PATENT DOCUMENTS

| CN | 1258700 A | 7/2000 |
|---|---|---|
| CN | 101074326 A | 11/2007 |
| CN | 101451022 A | 6/2009 |
| CN | 101463194 A | 6/2009 |
| CN | 101974258 A | 2/2011 |
| JP | 5507263 A | 10/1993 |
| JP | 07-331110 A | 12/1995 |
| JP | 2002-104923 A | 4/2002 |
| JP | 2002256147 A | 9/2002 |
| JP | 2008-195766 A | 8/2008 |
| JP | 2010053350 A | 3/2010 |
| WO | 2008036151 A1 | 3/2008 |
| WO | 2011010291 A1 | 1/2011 |

OTHER PUBLICATIONS

International Search Report for PCT/EP2013/000642 dated Jun. 17, 2014.
English Abstract of JP2010053350, Publication Date: Mar. 11, 2010.
English Abstract of JP2002256147, Publication Date: Sep. 11, 2002.
English Abstract of WO2011010291, Publication Date: Jan. 27, 2011.
Office Action in corresponding JP Appln. 2015-502123 dated Aug. 23, 2016.
English machine translation of JP 2002-104923 issued on Oct. 4, 2002 to KAO Corp.
English machine translation of JP 2008-195766 issued on Aug. 28, 2008 to Denso Corp.
Office Action in corresponding JP Appln. 2015-502123 dated Jun. 13, 2017.
Office Action in corresponding CN Appln. 2016-10858646.2 dated May 4, 2018 (pp. 1-10) and english summary thereof.

* cited by examiner

*Primary Examiner* — Jane L Stanley
(74) *Attorney, Agent, or Firm* — Millen White Zelano & Branigan

(57) ABSTRACT

The present invention relates to thermally conductive pigments which consist of a substrate and a coating applied thereto comprising aluminum oxide and/or aluminum oxide hydrate, to a process for the preparation of these pigments, and to the use thereof.

21 Claims, No Drawings

THERMALLY CONDUCTIVE, PLATE-SHAPED PIGMENT COATED WITH ALUMINIUM OXIDE

The present invention relates to pigments, in particular thermally conductive pigments, which consist of a flake-form substrate and an aluminium oxide and/or aluminium oxide hydrate layer located thereon, to a thermally conductive composition comprising these pigments, and to the use of the said pigments and the composition, in particular for the insulation of electrical high-voltage machines.

Electrical machines and equipment, in particular high-voltage electrical machines, in which heavy currents flow, such as generators, stator cores, rotors or cable bundles, to mention but a few, have to be reliably protected against spontaneous discharges. At the same time, it is necessary to dissipate the heat formed during operation inexpensively in the most direct manner possible in order to be able fully to utilise the power capacity of the equipment. Equipment of this type is therefore provided with expensive insulation layers, which are simultaneously combined with indirect cooling, such as, for example, cooling in a stream of cooling gas or air. Since the power of high-voltage machines is constantly being increased, the generation of heat by the equipment and thus the requirements of high-performance materials for the insulation layers, which ideally facilitate both electrical insulation and also heat dissipation, are increasing.

There is therefore a constant search for methods to improve the thermal conductivity of the insulation layers used in order to be able to dissipate the heat formed by simple air or cooling-gas cooling, even in the case of very compact electrical cable packages.

For the purposes of insulation of high-voltage machines, use has hitherto also been made, besides of pure insulating polymers or polymers comprising fillers, of so-called mica papers, in which mica particles can be arranged on support materials in such a way that adhesion forces give rise to a paper-like structure, which can be detached from the support material and employed in the form of strip-form materials, so-called insulating tapes, for insulating windings. These mica papers can be mechanically stabilised with glass-fibre fabrics or other materials and impregnated with synthetic resins on later use thereof.

Mica is a dielectric material which, owing to its high dielectric strength, can be used particularly well in particle form for the insulation of high-voltage cables, but has very low thermal conductivity.

There has therefore been no lack of attempts to improve the thermal conductivity of insulating layers of this type.

Insulating layers for high-voltage equipment essentially consist either of the above-mentioned multilayered dielectric packages comprising mica paper, exactly the same packages which, after being wrapped around the equipment parts to be insulated, are encapsulated and thus impregnated with a resin material, after which the latter is solidified to form a compact body, of a direct coating, similar to a paint coating, on the surface of the equipment parts in question, or of a compact filler-containing resin material, which in solidified form surrounds the parts to be insulated.

In each of these embodiments, additives can be introduced which improve the thermal conductivity of the overall insulation.

Thus, DE 197 18 385 A1, for example, discloses a coating for components of electrical machines which consists of a paint which comprises thermally conductive additives, for example particles of boron nitride, aluminium nitride, silicon nitride, aluminium oxide, magnesium oxide, and/or silicon carbide.

WO 2008/091489 A1 describes an insulating tape in the form of a modified mica paper which, besides mica flakes, comprises hexagonal boron nitride having particle sizes up to 1 µm and optionally also further thermally conductive materials.

WO 2005/123867 discloses an inorganic/organic, resin-based composition which surrounds the parts to be insulated as continuous mouldings and comprises thermally conductive fillers which have a length of up to 1 µm and an aspect ratio of 3-100.

WO 2008/042076 also describes a thermally conductive resin composition which comprises, as fillers, thermally conductive materials which have a particle length of up to 1 µm and are each surrounded by a resin sheath.

The applications described above, which, besides mica, also comprise thermally conductive particles, have in common that both types of particle are either randomly distributed in the composition, which, depending on the actual make-up of the entire composition, places the focus of action either on the thermal conductivity or the dielectric insulation, or that mica and thermally conductive additives are located in different layers of the overall insulation, which makes production of the insulating layers more difficult and expensive.

It would therefore be desirable to find a thermally conductive additive for insulating compositions which can be prepared in a simple manner, can be employed in the conventional insulating compositions of various make-up and has both dielectric and thermally conducting properties in a balanced ratio.

The object of the present invention is therefore to provide a thermally conductive additive which can be employed in a variable manner in various embodiments of insulations, in particular for high-voltage machines, equally has dielectric properties at the same time as high dielectric strength and good thermal conductivity, can serve as substitute for the mica used to date and in addition can be prepared inexpensively via a simple process.

A further object of the invention consists in providing a process for the preparation of an additive of this type.

In addition, the object of the present invention consists in providing a thermally conductive composition, in particular for use for insulation purposes, and indicating the use of the thermally conductive additive.

The object of the present invention is achieved by a thermally conductive pigment which consists of a flake-form, dielectric substrate and a layer located thereon which comprises at least 80% by weight, based on the total weight of the layer, of aluminium oxide and/or aluminium oxide hydrate.

The object of the invention is also achieved by a process for the preparation of a thermally conductive pigment in which a flake-form, dielectric substrate is coated with a layer which consists of at least 80% by weight, based on the total weight of the layer, of aluminium oxide hydrate and is subsequently calcined.

The object of the present invention is equally achieved by a thermally conductive composition which comprises the said thermally conductive pigment.

The object of the present invention is likewise achieved by the use of the said thermally conductive pigment as filler in paints, coatings, plastics, resin compositions, ceramic materials and glasses, in particular for the insulation of electrical high-voltage machines.

The thermally conductive pigment in accordance with the present invention has a flake-form, dielectric substrate. Suitable substrates are, in particular, natural or synthetic mica flakes, $Al_2O_3$ flakes, $SiO_2$ flakes, glass flakes, borosilicate flakes, serecite flakes, kaolin flakes, talc flakes or mixtures thereof.

Particular preference is given to natural or synthetic mica flakes and $Al_2O_3$ flakes since these have high dielectric strength and, in the case of $Al_2O_3$ flakes, it is additionally also possible to connect small and very thin starting flakes with the aid of the subsequent coating to form larger flake-form aggregates.

Flake-form in the sense of the present invention is taken to mean a flat structure which, with its top and bottom side, has two surfaces approximately parallel to one another whose length and width dimension represents the largest dimension of the pigment. The separation between the said surfaces, which represents the thickness of the flake, has, by contrast, a smaller dimension.

The length and width dimension of all said substrates for the pigments according to the invention is in the range from 2 to 1000 μm, preferably from 10 to 400 μm, and in particular from 15 to 100 μm. It also represents the value which is usually referred to as particle size of the substrates. This is not critical as such, but relatively large particle sizes of the substrates within the said ranges are preferred. The thickness of the substrates is generally between 0.05 and 5 μm, preferably from 0.1 to 4.5 μm and particularly preferably from 0.2 to 1 μm.

The substrates have an aspect ratio (ratio of length to thickness) of at least 2, preferably of at least 10 and particularly preferably of at least 50.

Substrates of this type are commercially available and are offered or produced by various manufacturers as fillers or alternatively also as substrates for effect pigments.

The $SiO_2$ flakes employed as substrates can also be produced, for example, by the belt process described in WO 93/08237, with a water-glass solution as starting material.

Aluminium oxide flakes are preferably used in the form of single crystals, which can be produced by the process described in EP 763 573 B1, where they are described as substrates for effect pigments, and, besides aluminium oxide, may comprise small proportions of dopants, such as, for example, $TiO_2$, in the crystal.

The above-mentioned particle size of the substrates relates to the $d_{90}$ value in a volume-weighted measurement by means of laser diffraction, which can be determined, for example, using a Malvern Mastersizer 2000. The above-mentioned values virtually correspond to the particle size of the pigments according to the invention, since this likewise falls into the said range owing to the only small layer thickness of the layer located on the substrates. In particular, the particle size of the pigments according to the invention which are based on substrates comprising mica or $Al_2O_3$ can increase to a value of 1000 μm.

The average particle size $d_{50}$, which can likewise be determined by means of the above-mentioned laser diffraction method, is in the range from 5 to 400 μm, in particular from 15 to 300 μm, both for the substrates employed and also for the thermally conductive pigments according to the invention.

In accordance with the invention, a layer which comprises at least 80% by weight, in particular at least 90% by weight and preferably at least 95% by weight, based on the total weight of the layer, of aluminium oxide and/or aluminium oxide hydrate is located on the surface of the flake-form, dielectric substrate. The proportion of aluminium oxide and/or aluminium oxide hydrate in the layer can also be 100%, based on the total weight of the layer. The proportion of aluminium oxide hydrate arises here via the preferred preparation process of the pigments according to the invention, in which firstly aluminium oxide hydrate is applied to the flake-form, dielectric substrate and is subsequently converted into aluminium oxide in a calcination process. Since the calcination of the layer does not always result in 100% conversion of the entire layer into aluminium oxide, a proportion of aluminium oxide hydrate may arise in the layer. The aluminium oxide/oxide hydrate proportion of the layer thus consists of aluminium oxide or of aluminium oxide and aluminium oxide hydrate. However, the proportion of aluminium oxide hydrate in the layer is preferably not greater than 50%, in particular not greater than 20% and particularly preferably not greater than 5%, based on the total content of aluminium oxide and aluminium oxide hydrate in the layer.

Besides aluminium oxide hydrate and aluminium oxide, further metal oxides or metal oxide hydrates which are intended to improve the thermal conductivity of the pigment according to the invention, simplify the application of the aluminium ion-containing layer or increase the adhesion thereof to the substrate may also be present in the layer on the flake-form, dielectric substrate. The proportion of these further metal oxides or metal oxide hydrates here is up to 20% by weight, in particular 0.1 to 10% by weight, preferably 0.1 to 5% by weight, in each case based on the total weight of the layer. For example, magnesium oxide (MgO), chromium oxide ($Cr_2O_3$) or silicon oxide ($SiO_2$) may be present in the layer in the said proportions, preferably magnesium oxide and silicon oxide are employed. A proportion of MgO is particularly preferred.

In total, the thermally conductive pigment according to the invention consists of 30 to 90% by weight of substrate and 10 to 70% by weight of layer comprising aluminium oxide and/or aluminium oxide hydrate, where the sum of substrate and layer is 100% by weight.

The composition may vary within the said limits, a proportion of 40 to 60% by weight of substrate and 60 to 40% by weight of layer is preferred.

The invention also relates to a process for the preparation of a thermally conductive pigment in which a flake-form, dielectric substrate is coated with a layer which consists of at least 80% by weight, based on the total weight of the layer, of aluminium oxide hydrate and is subsequently calcined.

The flake-form substrates employed are the substrates already mentioned above in the corresponding size ratios.

The aluminium oxide hydrate layer is produced from suitable precursors of aluminium salts and optionally, as already described above, further metal salts, preferably by wet-chemical methods and from inorganic starting materials, in particular from halides, nitrates, sulfates, phosphates or oxalates of the corresponding metals. Particular preference is given to the use of halides, in particular chlorides. Particular preference is given to the use of aluminium chloride or aluminium chloride and magnesium chloride.

Processes of this type are already known per se. In the case of wet coating, the substrates are suspended in water, and one or optionally more hydrolysable metal salts are added at a pH which is suitable for hydrolysis. The pH here is selected so that preferably no secondary precipitations occur and the corresponding metal hydroxides, in particular aluminium hydroxide, are precipitated directly onto the flake-form substrates. The pH here is generally kept constant, which is usually achieved by addition of an acid or base. After application of the layer comprising aluminium hydroxide, the pigments are separated off from the suspension and dehydrated by drying, giving an aluminium oxide hydrate layer. The pigment obtained is subsequently calcined. The calcination is carried out at temperatures of 300 to 1200° C., preferably at temperatures of 650 to 950° C. During the calcination, all or at least some of the aluminium oxide hydrate is converted into aluminium oxide.

The reaction time is generally between 10 minutes and 4 hours, the calcination time between 10 minutes and 2 hours.

The finished layer comprising aluminium oxide and/or aluminium oxide hydrate has a layer thickness of 10 to 1000 nm, in particular of 40 to 300 nm.

The thermally conductive pigment according to the invention preferably consists merely of a flake-form dielectric substrate and a single layer located thereon which comprises at least 80% by weight of aluminium oxide or aluminium oxide and aluminium oxide hydrate, and, optionally, also further metal oxides or metal oxide hydrates, as already described above.

The compositions are, in particular, as follows:
substrate-aluminium oxide
substrate-aluminium oxide+up to 20% by weight of MgO
substrate-aluminium oxide+up to 20% by weight of $SiO_2$
substrate-aluminium oxide+aluminium oxide hydrate
substrate-aluminium oxide+aluminium oxide hydrate+up to 20% by weight of MgO
substrate-aluminium oxide+aluminium oxide hydrate+up to 20% by weight of $SiO_2$ Preference is given up to the compositions:
mica flake-aluminium oxide
mica flake-aluminium oxide+up to 20% by weight of MgO
mica flake-aluminium oxide+up to 20% by weight of $SiO_2$
mica flake-aluminium oxide+aluminium oxide hydrate
mica flake-aluminium oxide+aluminium oxide hydrate+up to 20% by weight of MgO
mica flake-aluminium oxide+aluminium oxide hydrate+up to 20% by weight of $SiO_2$
and
$Al_2O_3$ flake-aluminium oxide
$Al_2O_3$ flake-aluminium oxide+aluminium oxide hydrate,
where, in the case of the latter, the flake-form $Al_2O_3$ substrates preferably represent single-crystal flake-form substrates, which can be produced, for example, by the process described in EP 763 573 B1.

In contrast to flake-form $Al_2O_3$ substrates produced by other processes, single-crystal substrates of this type have a corundum crystal structure, which, after application of the aluminium oxide-containing layer, continues in the latter during calcination since the aluminium oxide hydrate applied, or the resultant aluminium oxide, grows epitactically on the substrate and is therefore likewise forced into this crystal structure.

In detail, during the coating of the substrates, in the first step water-containing aluminium hydroxide is deposited on the substrates and is then dried and dehydrated thermally. Depending on the drying and calcination conditions selected in the subsequent steps and depending on the substrate and layer composition, aluminium oxide hydrates, α- or γ-aluminium oxide or a ceramic aluminium oxide layer form in the layer. Very finely divided inorganic particles, for example comprising corundum, may likewise be co-precipitated during deposition of the aluminium hydroxide layer and are then likewise present in the layer.

Aluminium oxide in the corundum structure has higher thermal conductivity than γ-aluminium oxide, which is usually obtained in the case of precipitation of aluminium oxide hydrate onto silicate substrate materials.

In addition, in the case of the single-crystal forms and also in the case of all other aluminium oxide flakes as substrate material, an aggregation of finely divided flake-form substrates to form larger $Al_2O_3$ pigments, which consist to a very high proportion of aluminium oxide, can be achieved by the application of an aluminium oxide-containing layer in accordance with the present invention. Such aggregates can arrange themselves well alongside one another in the surface in thermally conductive compositions and thus result in virtually continuous flat structures similar to mica paper, but have high thermal conductivity and good dielectric behaviour at the same time as high dielectric strength.

In the case where the thermally conductive pigment in accordance with the present invention also requires surface treatment for incorporation into the respective application medium, the usual post-coating methods for effect pigments are suitable, but should in the present case be restricted to organic post-coatings in order to avoid reducing the thermal conductivity of the pigments due to inorganic post-treatments which may have an adverse effect. Examples of such organic post-coatings, which serve for improved dispersibility and adaptation of the pigments according to the invention in the respective application medium, can be found, for example, in U.S. Pat. No. 5,759,255, DE 43 17 019, DE 39 29 423, EP 0 492 223, EP 0 141 174, EP 0 764 191 or EP 0 465 805, the disclosure content of which is hereby incorporated by way of reference.

The present invention covers, depending on the application medium, both the thermally conductive pigment according to the invention with and also without organic post-coating.

The process step of application of the organic coating can optionally be carried out directly after the other steps of the process according to the invention or also later. The organic substances applied here merely comprise a proportion by weight of 0.1 to 5% by weight, preferably 0.5 to 3% by weight, of the entire pigment.

The present invention furthermore relates to a thermally conductive composition which comprises a thermally conductive pigment in accordance with the present invention.

Since the pigment according to the invention, due to its very finely divided form, can be employed in a very variable manner, it can be used in virtually all known insulating compositions. This applies both to rigid and also to flexible, electrically insulating compositions.

These are, for example, insulating tapes, which are flexible and which may comprise the pigment according to the invention in a flat arrangement and in high concentration, which can be up to 95% by weight, based on the total weight of the primary insulating tape, where the pigment according to the invention can form a dense layer built up in the manner of a roof tile which has high dielectric strength and at the same time good thermal conductivity. Insulating tapes of this type are generally reinforced with glass-fibre substrates or other suitable substrate materials in order to be able to wind up the tapes firmly and without interspaces and are optionally additionally impregnated with plastic resins in order to provide the tapes with mechanical strength while retaining flexibility.

However, the thermally conductive composition according to the invention can likewise be a direct coating, preferably in the form of a paint, in which the pigment according to the invention is incorporated into a standard gloss paint which is suitable for use on heat-generating substrates. The pigment according to the invention can be incorporated here in a concentration of up to 40% by weight, based on the weight of the paint, which is usual for paints.

In addition, the thermally conductive pigment according to the invention can also be incorporated into a casting compound which is employed for insulating purposes as cured moulding either additionally around the above-mentioned insulating tapes or alternatively as the only insulating measure around machine parts to be insulated. The concentration of the pigment according to the invention here is up to 70% by weight, based on the total weight of the casting compound or moulding.

The lower limit for the content of thermally conductive pigments according to the invention is regarded as in each case being 10% by weight, based on the weight of the composition, for all applications, since a lower proportion would result in inadequate thermal conductivity of the composition according to the invention.

In each of the above-mentioned thermally conductive compositions, it is advantageous to combine the thermally conductive pigment according to the invention with at least one further thermally conductive pigment which is selected from the group consisting of aluminium oxide particles, boron nitride particles, boron carbide particles, carbonitride particles, aluminium carbide particles, aluminium nitride particles, silicon carbide particles, silicon nitride particles, magnesium oxide particles, beryllium oxide particles and diamond particles.

These particles additionally increase the thermal conductivity of the composition according to the invention. The said particles are commercially available and are generally finely divided in granule form, spherical form, spheroidal form, oval form, cubic form, cube form or rod form. They usually have particle sizes of 1 to 100 µm.

The said particles are particularly preferably employed in spherical, spheroidal, cubic or cube forms together with the thermally conductive pigments according to the invention in thermally conductive compositions.

These particle shapes of thermally conductive particles, in combination with the flake-form pigments according to the invention, result in compositions in which effective thermal conduction pathways can form, since the rather isotropic additives readily close any gaps present between the flake-form pigments, while the flake-form pigments generate a structure of the pigment layers formed which is similar to roof tiles, augmenting the positive dielectric properties. In addition, flake-form pigments can align themselves well to the surface in coatings, which in turn effects the formation of a dense pigment layer.

In a particularly preferred embodiment of the present invention, the thermally conductive pigments according to the invention are employed in a thermally conductive composition in combination with spherical, spheroidal, cubic or cube-shaped aluminium oxide particles. The mixing ratio of pigments according to the invention and spherical aluminium oxide particles here is at least 50:50, but preferably from 60:40, in particular from 80:20, and can be up to 99:1, where the greater proportion in each case relates to the pigment according to the invention.

A special feature of aluminium oxide, in contrast to the other additional thermally conductive materials mentioned above, is that it is likewise commercially available in flake form. In a further preferred embodiment of the present invention, a thermally conductive composition is therefore provided which comprises the thermally conductive pigments according to the invention and additionally uncoated aluminium oxide flakes. These can be commercially available aluminium oxide flakes from various manufacturers. Owing to the corundum structure, however, flake-form aluminium oxide single crystals are preferably employed, which can be prepared in accordance with EP 763 573 B1, as has already been described above. In general, a mixing ratio of at least 30:70, preferably from 60:40, in particular from 80:20 and up to 99:1, where the former value in each case relates to the pigment according to the invention, between thermally conductive pigments according to the invention and flake-form aluminium oxide particles is maintained here in the thermally conductive composition.

In addition to the thermally conductive pigments according to the invention and the flake-form aluminium oxide particles, further thermally conductive pigments of those mentioned above, but in particular aluminium oxide particles in spherical, spheroidal, cubic or cube form, can also be employed in the composition according to the invention.

In general, the thermally conductive pigment according to the invention is present in the thermally conductive composition in accordance with the present invention with a proportion of 10 to 95% by weight, based on the total weight of the composition. The respective specific proportions of the pigment according to the invention in the thermally conductive composition are dependent on the type of the respective composition, the specific application and the type and amount of any further thermally conductive particles additionally employed, which correspondingly reduces the proportion of pigments according to the invention in the application medium.

The respective specific pigment proportion which is most suitable for the application or the mixing ratio of pigments according to the invention with further thermally conductive pigments can be determined in accordance with the specifications made in advance by the corresponding person skilled in the art without inventive step by means of simple experiments.

The further constituents of the respective thermally conductive composition, such as binders, solvents, assistants and additives, arise from the requirements of the specific area of application and can be learnt from the prior art known for this purpose.

The present invention additionally furthermore relates to the use of the thermally conductive pigment according to the invention and the thermally conductive composition according to the invention.

The thermally conductive pigment in accordance with the present invention is preferably used as filler in application media, such as paints, coatings, plastics, resin compositions, ceramic materials and glasses. It can likewise be employed for the preparation of dry preparations or in pigment preparations. It can be employed in the respective application media individually or in mixtures of pigments according to the invention with various substrate materials, but can also be employed in mixed form in mixtures with other thermally conductive pigments and/or with other particulate additives of all types which are used for colouring or as functional additives.

In particular, it is suitable as filler in the said application media if the latter are employed for the insulation of electrical high-voltage machines. Thermally conductive compositions according to the invention are therefore preferably paints for the direct coating of machine parts of high-voltage machines or resin compositions which are used in the form of cured mouldings for covering the machine parts to be insulated.

However, compositions according to the invention can also represent flexible insulating tapes which have a very high pigment content (up to 95% by weight) and an only low binder content and which can be mechanically reinforced by glass-fibre or other fabric.

The high-voltage machines or parts thereof to be insulated are, for example, motors, generators, stators, rotors, coils or cables, in particular stator cores and cable bundles which are operated with high electrical voltage and high current strength and therefore have to be protected not only against dielectric breakdown, but also require effective cooling.

The present pigments and thermally conductive compositions which comprise them have, naturally on use of suitable binders and additives, a dielectric behaviour. Furthermore, the flake-form shape of the pigments in the application media gives rise to an alignment of the pigments in the manner of roof tiles, which ensures a dense barrier layer of flake-form dielectric pigments and thus guarantees high dielectric strength of the composition. Due to the comparatively large particle size of the flake-form thermally conductive pigments, fewer pigment particles in total are required in order to enable effective heat dissipation through the formation of heat-conduction tracks. This is important, in particular, in application media in which the use of pigments is limited due to the technology, for example in paints.

Furthermore, both the thermally conductive pigments according to the invention and also the compositions comprising these pigments have good thermal conductivity, which is higher than the thermal conductivity in conventional applications in which mica is employed instead of the pigment according to the invention.

The present invention will be described in greater detail with reference to the following examples, but is not intended to be reduced thereto.

EXAMPLE 1

Mica with $Al_2O_3$ Coating

A solution of 468 g of $AlCl_3*6H_2O$ and 6 g of $MgCl_2*6H_2O$ is slowly metered into a suspension of 100 g of muscovite mica having an average particle size of 25 µm and a thickness of about 300 nm in 1 liter of water at 80° C. The pH is kept at pH 6.5 using sodium hydroxide solution. When the addition is complete, the mixture is stirred for a further 1 hour, the product is subsequently filtered off using a suction filter, washed with water, dried at 120° C. and then calcined at 850° C. for 30 min, giving 195 g of the aluminium oxide-coated mica pigment (about 50% by weight of $Al_2O_3$) as white powder.

EXAMPLE 2

Synthetic Mica with $Al_2O_3$ Coating

A solution of 140 g of $AlCl_3*6H_2O$ and 2 g of $MgCl_2*6H_2O$ is slowly metered into a suspension of 100 g of synthetic mica (fluorophlogopite) having an average particle size of 300 µm and a thickness of about 5 µm in 1 liter of water at 80° C. with stirring. The pH is kept at pH 6.5 using sodium hydroxide solution. When the addition is complete, the mixture is stirred for a further 1 hour, the product is subsequently filtered off using a suction filter, washed with water, dried at 120° C. and calcined at 850° C. for 30 min, giving 128 g of the aluminium oxide-coated mica pigment (about 23% by weight of $Al_2O_3$) as white powder.

EXAMPLE 3

Aluminium Oxide Flakes with $Al_2O_3$ Coating 50 g of aluminium oxide flakes, produced by the process described in EP 763 573, having an average particle size of 20 µm and an average thickness of 200 nm are suspended in 1 liter of water. A solution of 178 g of $AlCl_3*6H_2O$ is slowly metered into this suspension at 80° C. with stirring. The pH is kept at pH 6.5 using sodium hydroxide solution. When the addition is complete, the mixture is stirred for a further 1 hour, the product is subsequently filtered off using a suction filter, washed with water, dried at 120° C. and then calcined at 800° C. for 30 min, giving 172 g of the coated aluminium oxide pigment. The coated pigment consists of flake-form aggregates having an average particle size of about 100 µm.

EXAMPLES 4-6

Mixtures of the Pigments According to Example 1-3 with Further Thermally Conductive Pigments In each case, 67 g of the pigments from Examples 1-3 are mixed with in each case 33 g of a spherical α-aluminium oxide pigment having an average particle size of 2 µm, giving in each case 100 g of the mixture.

Example 4: Pigment from Example 1+spherical α-aluminium oxide
Example 5: Pigment from Example 2+spherical α-aluminium oxide
Example 6: Pigment from Example 3+spherical α-aluminium oxide

EXAMPLES 7-13

Thermally Conductive Insulations

A solution of a Novolak epoxy resin with dicyanamide as curing agent in methyl ketone is in each case mixed with pigment or pigment mixture according to Examples 1 to 6. The pigment proportion is in each case 50% by weight, based on the sum of the solids proportions of epoxy resin, curing agent and pigment.

In each case, films are produced by coating the mixtures onto a PET film with a thickness of 100 µm by means of a doctor blade, evaporating the solvent at room temperature and drying at 75° C. for 30 minutes. The films obtained are in each case still tacky and are laminated one above the other in 12 layers, where in each case a coated film surface is applied to the coated side of another film, and the top PET films are peeled off. A continuous layer package with a layer thickness of 1 mm is obtained. The layer package is subsequently removed from the lower film layer and cured at 150° C.

For comparison, a sample is produced with pure mica with an analogous proportion of pigment (Example 13).

In each case, the thermal conductivity (lambda) of the samples is measured through the surface by means of a Netzsch LFA 447 NanoFlash® temperature conductivity meter with xenon flash.

The measurement results are shown in Table 1.

TABLE 1

| Example No. | Pigment from Example | Thermal conductivity lambda in W/m * K at | | | | |
|---|---|---|---|---|---|---|
| | | 30° C. | 50° C. | 70° C. | 90° C. | 110° C. |
| 7 | 1 | 0.3 | 0.35 | 0.4 | 0.4 | 0.39 |
| 8 | 2 | 0.27 | 0.28 | 0.29 | 0.28 | 0.27 |
| 9 | 3 | 0.36 | 0.44 | 0.42 | 0.40 | 0.39 |
| 10 | 4 | 0.38 | 0.40 | 0.42 | 0.43 | 0.43 |
| 11 | 5 | 0.36 | 0.43 | 0.41 | 0.40 | 0.39 |

TABLE 1-continued

| Example No. | Pigment from Example | Thermal conductivity lambda in W/m * K at | | | | |
|---|---|---|---|---|---|---|
| | | 30° C. | 50° C. | 70° C. | 90° C. | 110° C. |
| 12 | 6 | 0.44 | 0.45 | 0.49 | 0.49 | 0.48 |
| 13 | Comparison | 0.21 | 0.23 | 0.24 | 0.25 | 0.25 |

As the measurement results show, all pigments according to the invention in a composition according to the invention have superior thermal conductivity to pure mica. The thermal conductivity of the composite can be increased further if a spherical aluminium oxide is in each case admixed with the thermally conductive pigment according to the invention.

The invention claimed is:

1. A thermally conductive pigment consisting of a flake-form, dielectric substrate and a single layer located thereon, said single layer comprises at least 80% by weight, based on the total weight of the layer, of aluminium oxide and/or aluminium oxide hydrate and 0.1 to 10% by weight, based on the total weight of the layer, of MgO, $Cr_2O_3$ or $SiO_2$; and
    wherein the substrate is selected from the group consisting of natural mica flakes, synthetic mica flakes, kaolin flakes, talc flakes and mixtures thereof.

2. The thermally conductive pigment according to claim 1, wherein the thermally conductive pigment consists of 30-90% by weight of the substrate and 10-70% by weight of the layer comprising aluminium oxide and/or aluminium oxide hydrate, wherein the sum of the substrate and the layer is 100% by weight.

3. The thermally conductive pigment according to claim 1, wherein the thermally conductive pigment has an average particle size $d_{50}$ in the range from 5 to 400 µm.

4. A process for the preparation of a thermally conductive pigment according to claim 1, wherein a flake-form, dielectric substrate is coated with a single layer which consists of at least 80% by weight, based on the total weight of the layer, of aluminium oxide hydrate and 0.1 to 10% by weight, based on the total weight of the layer, of MgO, $Cr_2O_3$ or $SiO_2$; and is subsequently calcined.

5. A thermally conductive composition comprising a thermally conductive pigment according to claim 1.

6. The thermally conductive composition according to claim 5, additionally comprising at least one thermally conductive pigment selected from the group consisting of aluminium oxide particles, boron nitride particles, boron carbide particles, carbonitride particles, aluminium carbide particles, aluminium nitride particles, silicon carbide particles, silicon nitride particles, magnesium oxide particles, beryllium oxide particles and diamond particles.

7. The thermally conductive composition according to claim 6, wherein the additional thermally conductive pigment consists of flake-form aluminium oxide particles.

8. The thermally conductive composition according to claim 6, wherein at least one of the additional thermally conductive pigments has a spherical, spheroidal, oval or a cube shape.

9. The thermally conductive composition according to claim 5, wherein the thermally conductive pigment is present in the composition with a proportion in the range from 10 to 95% by weight, based on the total weight of the composition.

10. The thermally conductive composition according to claim 5, selected from the group consisting of flexible electrically insulating compositions and rigid electrically insulating compositions.

11. The thermally conductive composition according to claim 5, wherein the composition is an insulating tape, a mechanically stabilised insulating tape, a direct coating or a resin-containing casting compound.

12. A preparation which is a dry preparation or pigment preparation, wherein said preparation comprises a filler and said filler comprises the thermally conductive pigment according to claim 1.

13. A method comprising insulating electrical high-voltage machines with said thermally conductive pigment according to claim 1.

14. The method according to claim 13, wherein the electrical high-voltage machines are motors, generators, stators, rotors, coils or cables.

15. The thermally conductive pigment according to claim 1, wherein the substrate is selected from the group consisting of natural mica flakes and synthetic mica flakes and the layer comprises the MgO.

16. A thermally conductive pigment consisting of a flake-form, dielectric substrate and a single layer located thereon, wherein the single layer comprises at least 80% by weight, based on the total weight of the layer, of aluminium oxide and/or aluminium oxide hydrate, and wherein the substrate is an $Al_2O_3$ flake.

17. The thermally conductive pigment according to claim 16, wherein a plurality of said thermally conductive pigments forms a flake form aggregate.

18. The thermally conductive pigment according to claim 17, wherein the pigment has an average particle size $d_{50}$ in the range from 5 to 400 µm.

19. A process for the preparation of a thermally conductive pigment according to claim 16, wherein a flake-form $Al_2O_3$ substrate is coated with a single layer which consists of at least 80% by weight, based on the total weight of the layer, of aluminium oxide hydrate and is subsequently calcined.

20. A thermally conductive composition comprising a thermally conductive pigment according to claim 16.

21. The thermally conductive composition according to claim 20, wherein the thermally conductive pigment is present in the composition with a proportion in the range from 10 to 95% by weight, based on the total weight of the composition.

* * * * *